United States Patent [19] | [11] Patent Number: 4,843,494
Cronin et al. | [45] Date of Patent: Jun. 27, 1989

[54] DATA STORAGE APPARATUS USING OPTICAL SERVO TRACKS

[75] Inventors: David V. Cronin, Peabody; John M. Guerra, Concord; Paul F. Sullivan, Westwood; Patricia A. Mokry, Medford; Peter P. Clark, Acton; Vincent L. Cocco, Wakefield, all of Mass.

[73] Assignee: Polaroid Corporation, Cambridge, Mass.

[21] Appl. No.: 109,289

[22] Filed: Oct. 15, 1987

[51] Int. Cl.⁴ .............................................. G11B 13/00
[52] U.S. Cl. ................................ 360/77.03; 350/3.72; 350/162.16; 350/413; 350/432; 369/14; 369/44; 369/112
[58] Field of Search ................... 360/77, 78, 110, 105; 369/14, 44, 32, 33, 41, 109, 112, 120, 46, 13, 122; 350/3.72, 162.16, 413, 432

[56] References Cited

U.S. PATENT DOCUMENTS 2,092,892 12/1935 Runge .................................. 369/112
3,833,769 9/1974 Compaan et al. ................... 369/120
4,570,191 2/1986 Di Stefano et al. ................. 369/13
4,633,451 12/1986 Ahn et al. ............................. 369/14
4,733,065 3/1988 Hoshi et al. ......................... 369/112

FOREIGN PATENT DOCUMENTS

85/02933 7/1983 PCT Int'l Appl. .

OTHER PUBLICATIONS

IBM Technical Disclosure Bulletin, vol. 26, No. 6, Nov. 1983, pp. 2951-2952, Holographically Generated High Resolution Track Servo Pattern for Optical or Capacitive Readout, Werlich et al.
IBM Technical Disclosure Bulletin, vol. 20, No. 10, Mar. 1978, pp. 4108-4109, Optical Servo of Magnetic Recording, Hoagland.
C. Goudal, Abstract of French Application FR2315142, filed Jul. 17, 1975, published Jan. 14, 1977, Derwent Publications Ltd.
IBM Technical Disclosure Bulletin, vol. 27, No. 7A, Dec. 1984, pp. 3994-3995, Optical Recording of Servo Pattern on Magnetic Disks, Aviram et al.
IBM Technical Disclosure Bulletin, vol. 25, No. 12, May 1983, pp. 6432-6433, Monolithic Optical Track Scanner for Magnetic Recording System, Scranton.
IBM Technical Disclosure Bulletin, vol. 27, No. 8, Jan. 1985, pp. 4877-4878, Servowriter Reference Clocks from Shaft Encoder Farran et al.
IBM Technical Disclosure Bulletin, vol. 23, No. 7B, Dec. 1980, p. 3319, Optical Storage of Data on a Magnetic Medium, Laming et al.
IEEE Transactions on Magnetics, vol. Mag 16, No. 5, Sep. 1980, pp. 631-633, Optical Method of the Head Positioning in Magnetic Disk Systems, Koshino et al.
IBM Technical Disclosure Bulletin, vol. 16, No. 9, Feb. 1974, p. 3020, Optical Servo Technique Using More Fringes, Hart.

Primary Examiner—Alan Faber
Assistant Examiner—Steven R. Garland
Attorney, Agent, or Firm—John S. Vale

[57] ABSTRACT

A magnetic data storage system for use with a double sided disk in which a prerecorded pattern of opaque optical lines is used to define the tracks in which magnetic data is to be stored. A separate optical system including an illumination source and a photosensitive detector is provided on a read/write assembly for each side of the disk. Each detector is designed also to serve as a reference grating. The illumination source is designed to image the prerecorded pattern of optical lines on the reference grating as an indication of the alignment of the read/write head of the assembly and a desired data track and any misalignment of the head and track generates a servo signal. The detector uses four separate photocells interleaved in a prescribed fashion to form a quadrature detector that is adjustable to compensate for various non-uniformities. One form of illumination source uses a surface-emitting light emitting diode and optics for forming a multiple beam source.

32 Claims, 9 Drawing Sheets

DATA STORAGE APPARATUS USING OPTICAL SERVO TRACKS

FIELD OF THE INVENTION

This invention relates to magnetic data storage or recording apparatus.

BACKGROUND OF THE INVENTION

Magnetic data storage or recording apparatus typically uses a magnetic storage or recording medium in which data is stored in tracks. Moreover, the trend in computer technology is to increase the amount and density of data stored in such media. This generally involves narrower and closer tracks to increase the density of tracks per inch (TPI). For example, high density storage disks typically have track densities of about 500 to 1000 TPI.

As track density increases, a narrow transducer or head is required for writing/reading the data in tracks and, furthermore, more precise tracking is needed to insure writing/reading of the desired track so that data can be retrieved correctly. To this end, it is vital that the transducer be located accurately on a selected track.

The art has recognized the need for accurate head tracking and various approaches to this end, including servo controlled head positioning systems, have been used with varying degrees of success.

In particular, it is important not only that the tracking technique be reliable but it is also highly desirable that it be easy and inexpensive to implement and also that it be able to handle the inevitable slight variations that are usual in data storage apparatus and media commercially available at reasonable prices.

In patent application, Ser. No. 898,527, which was filed on Aug. 21, 1986, and has a common assignee with the instant application, and which is incorporated herein by reference, there is a described magnetic data storage apparatus in which the storage medium, typically a disk, includes a pattern of optical tracks over which is superimposed the magnetic data. The optical pattern is formed on a transparent base material and comprises a large number of lines arranged in concentric rings that are essentially opaque to light radiation, spaced apart by gaps that are essentially transparent to light radiation. The base is over-coated, generally on both sides, with a layer of magnetic recording medium that is thin enough to be substantially light transparent.

The optical pattern in the disk typically is used as a Ronchi grating adapted for cooperation with a reference grating located outside the disk on a radially displaceable read/write transducer assembly that is part of the drive associated with the disk, when the disk is in an operative position. Illumination, provided from a light source on side of the disk, passes through both the Ronchi grating on the disk and the reference grating on the head assembly and is detected.

Movement of the reference grating with the head relative to the Ronchi grating modulates the intensity of the light reaching the detector in a substantially linear manner from track to track so as to provide head position error signal information to a servo system used to position the read/write transducer in the desired alignment with a chosen track of on the disk.

The particular apparatus described, while useful, has room for improvement in performance. In particular, for controlling tracking of magnetic heads on opposite sides of a double sided disk it utilizes a common illumination source along with a common detector that are relatively far apart and so subject to a variety of problems, such as parallax. Moreover, because a common detector is used for tracking control of both sides of the disk, it is not possible to optimize the spatial relationship of the various elements involved in the tracking for each of the two sides being tracked, such as having the detector on the same side as the active read/write head.

This is a particular problem when a replaceable storage medium, such as a flexible or floppy disk, is employed because one of the heads in the drive generally is mounted for movement toward and away from the opposite head between a confronting operative position and a spaced apart loading position to allow disk insertion and withdrawal. Also, the moveable head is typically mounted on a gimbal arrangement which allows it to better orient itself with respect to the flexible recording medium. Given the movable nature of the gimbal mounted head, its magnetic transducer can not be maintained in fixed spaced relation to a single common detector thereby resulting in incorrect error position signals.

Additionally, the signal-to-noise ratio relatively simple detection arrangement used in that system has room for improvement In particular, it would be useful to have a detection scheme that is less vulnerable to roughness and non-uniformities along the edges of the optical pattern, is able to average detection over relatively large areas to minimize the effect of localized non-uniformities or clumping of particles in the thin magnetic recording layers, is able to adjust for some offset between the magnetic center and optical center of the circular tracks, and is more amenable to adjustment to compensate for variations that are may exist among different disks, transducers, and disk drives as the result of being manufactured at different times.

Various other improvements are possible as will appear from the subsequent detailed description of the invention taken in conjunction with the drawings.

SUMMARY OF THE INVENTION

The present invention provides a number of features for improvement of the magnetic data storage apparatus described in the earlier application. It should be noted that some of the features are independent of others of the features so that a particular embodiment of the invention need not include all of the novel features to be described.

A first feature of the invention is the inclusion in a head carriage assembly of a pair of integrated heads each including its own read and/or write transducer, light source and detector and adapted for use to provide tracking control on a respective one of the two opposite sides of the disk or other storage medium. This arrangement substantially relaxes head alignment tolerances especially in the case of a flexible disk drive wherein the spaced relation between the transducer and its corresponding detector is fixed by this integrated head construction.

Additionally, another feature of the invention is that each of two separate detectors includes a photosensitive sensor which is designed to serve as the reference grating in its optical system to avoid the need for a separate or discrete reference grating. This integration of functions has the advantage of eliminating any gap between the reference grating and the sensor, thereby eliminating potential optical interference and diffraction.

Additionally, in its preferred form, the detector is a quadrature detector comprising four photocells interleaved to provide a desired spatial phase difference between cells that is useful for reducing common mode noise and averaging out minor local deviations from uniformity in the recording layers. Additionally, the quadrature detector introduces an additional degree of freedom that can be used to compensate for variations from disk to disk or drive to drive.

In particular, the preferred detector of an illustrative embodiment includes a plurality of elongated active photosensitive strip elements, typically sixteen, equally divided among four, uniformly interleaved but separate, photocells in which the width of each element is equal to the width of each of the opaque lines forming the optical grating in the disk and also of the transparent gaps between the opaque lines. Moreover, the elements are spaced apart by opaque optical stops one half the width of each of the elements. By properly interconnecting the four photocells in a novel circuit arrangement that includes several parameters that are variable, there results a detector that can be used to improve the signal-to-noise ratio, to average out non-uniformities in the recording layers, and to compensate for variations in different drives and different disks.

Moreover, one embodiment of the invention involves providing optical systems for each side of the disk in which collimated illumination from a quasi-point or quasi-line source or array of line sources causes the media grating to self image by diffraction on the reference grating to reduce the effect of any necessary separation of the two gratings.

Accordingly, magnetic storage apparatus in accordance with preferred embodiments of the invention are configured for use with a double sided storage medium, such as a disk, having a light transmissive support for first and second light transmissive recording layers on its opposite surfaces and including intermediate between the two storage layers an optical grating made up of opaque lines and light transmissive gaps of substantially equal widths.

Additionally, the head carriage assembly, that is mounted for radial movement relative to the disk, supports in addition to a separate read/write transducers adjacent to each of the two storage layers, first and second light sources on respective opposite sides of the disk, and first and second detectors aligned with the respective sources on opposite sides of the disk for defining a pair of separate light paths through the disk. Each of the detectors preferably includes a sensor formed by an integral multiple of four interleaved photosensitive elements appropriately spaced to serve as a reference grating for cooperation with the optical grating in the disk. Moreover, the photosensitive elements are interconnected to form four separate photocells which in turn are then interconnected in a circuit for developing a servo signal indicative of the position of the active head relative to a selected track. Additionally, the circuit includes parameters that may be varied for calibration purposes to compensate for variations from disk to disk.

Additionally, the efficiency, and hence accuracy, of the servo system can be further enhanced by the inclusion of novel illumination sources to cause the optical grating in the disk to self image by diffraction onto the reference grating formed at the detector. In one embodiment, the illumination arrangement uses an extended area light-emitting diode source with appropriate optics to form therefrom a line grating whose multiple beams self image the disk grating on the detector grating constructively. Alternatively, a laser diode or other type of light-emitting diodes may be used as the light source.

The invention will be more fully understood from the following detailed description taken in conjunction with the accompanying drawings.

BRIEF DESCRIPTION OF THE DRAWINGS

FIG. 10b is a schematic representation of the cross-section of the lens of FIG. 10a.

It is to be understood that the various figures are not to scale unless indicated.

DETAILED DESCRIPTION

Figure 1:
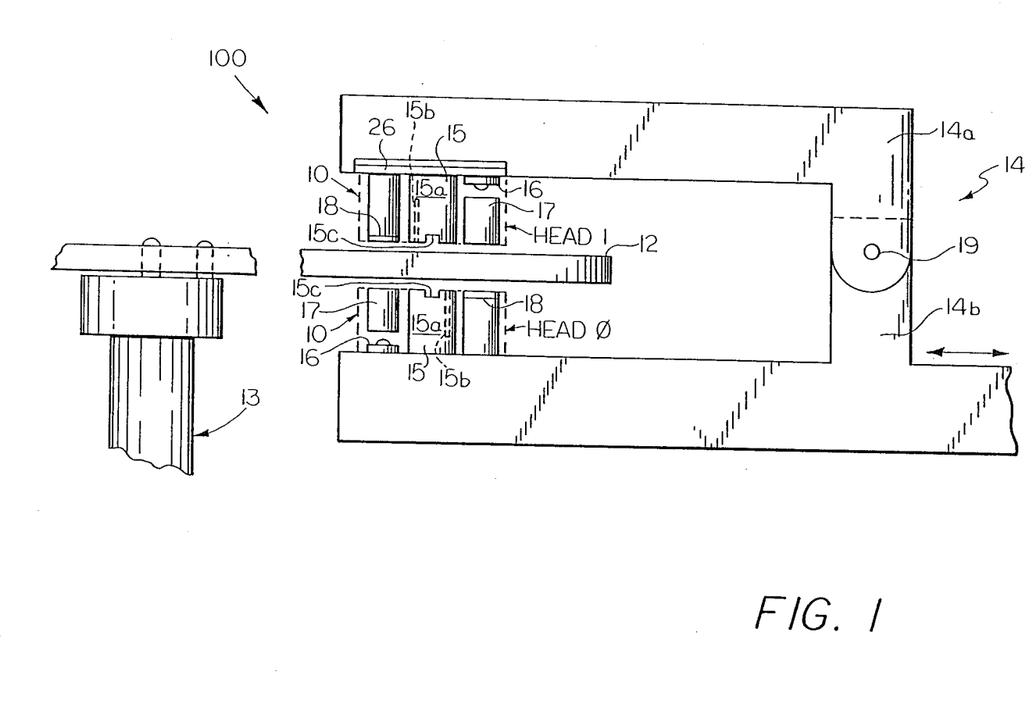
FIG. 1 shows in simplified form the basic elements of a head carriage assembly with a disk inserted therein in accordance with an illustrative embodiment of the invention.
Figure 2:
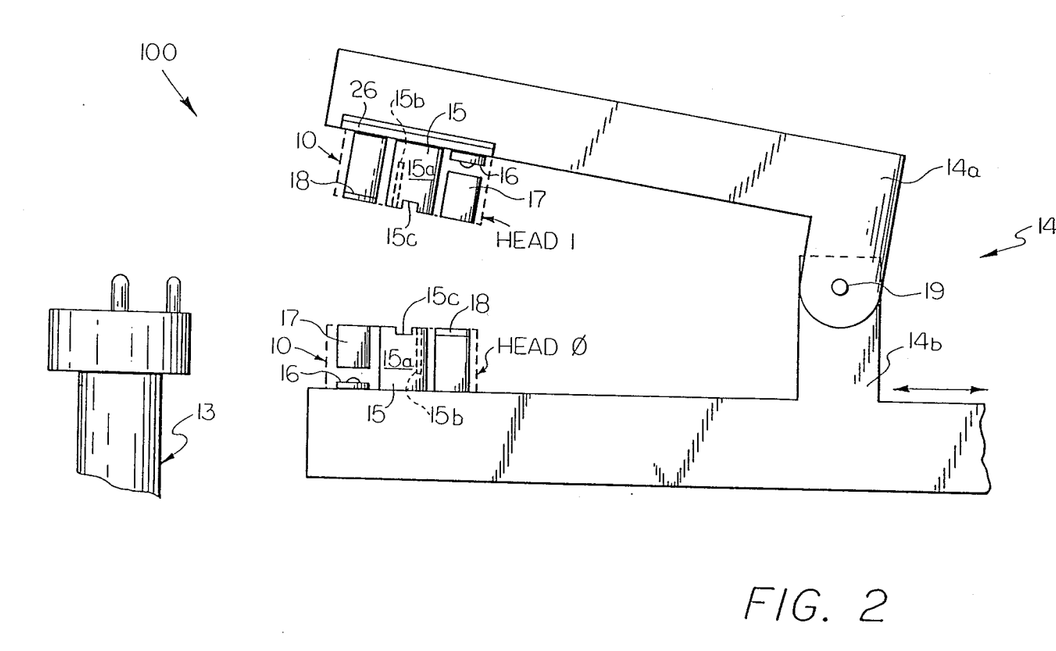
FIG. 2 shows in simplified form the same elements shown in FIG. 1 with the carriage configured for disk insertion and withdrawal.
Figures 3, 6:
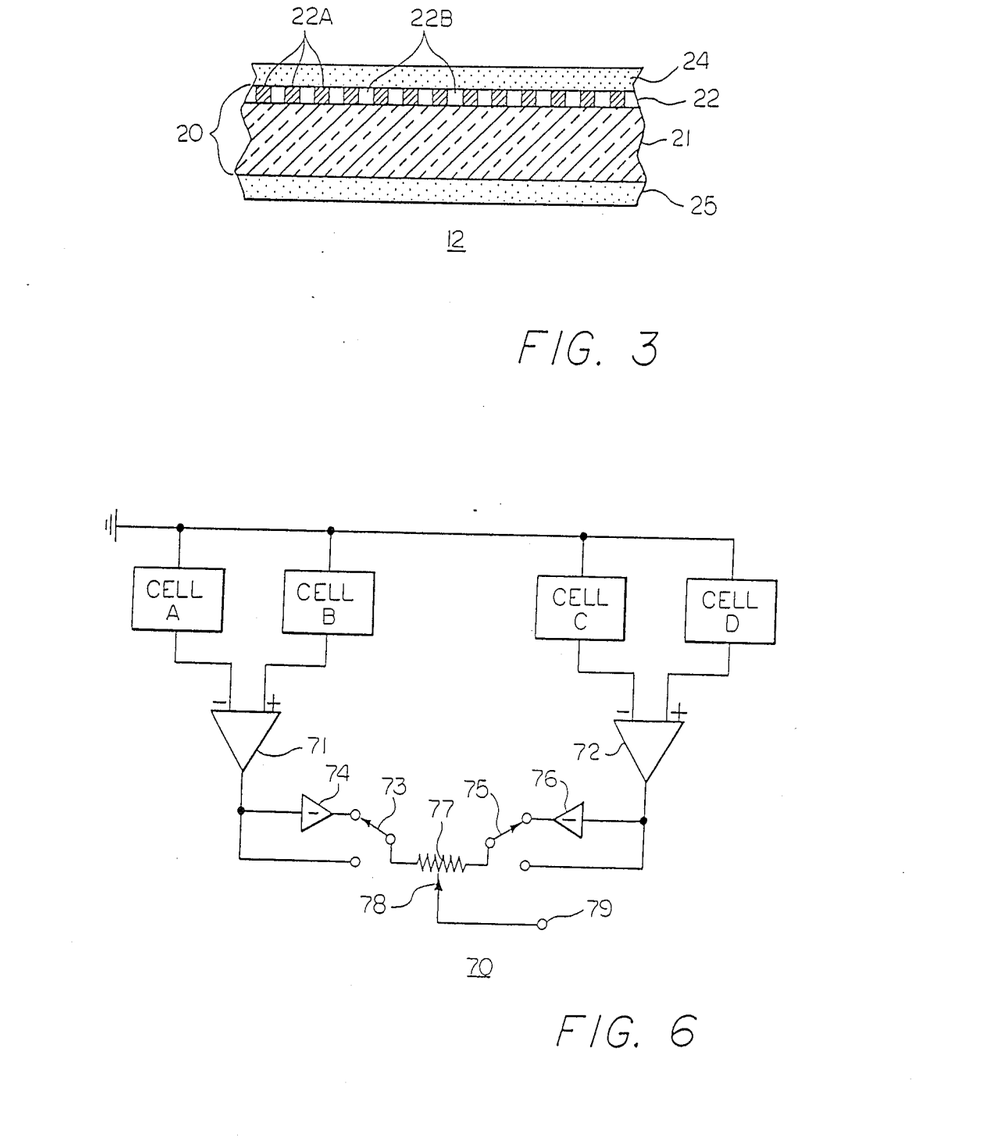
FIG. 3 shows in cross section a double sided magnetic disk including an optical grating for use in the assembly shown in FIG. 1.
FIG. 6 shows schematically a quadrature detector circuit using the sensor of FIG. 4 to provide a servo signal from the light incident on the sensor.

Referring now to FIG. 1, there is shown schematically the basic elements of a head carriage assembly 100, in accordance with an illustrative embodiment of the invention, operatively positioned with respect to a double sided magnetic disk 12, rotatably supported on a drive spindle 13, that may be essentially of the kind described in the aforementioned pending patent application, U.S. Ser. No. 898,527, and whose details are shown in FIG. 3. Head carriage assembly 100 and spindle 13 form part of a later to be described magnetic data storage apparatus or flexible magnetic disk drive embodying the present invention. Assembly 100 is also shown in FIG. 2 in its inoperative disk insertion or withdrawal position with the magnetic disk 12 removed.

As shown in FIG. 3, the disk 12 comprises a base 20, formed by a support member 21 chosen to be transparent to the radiation of the light or illumination source to be used for tracking control and an optical grating 22 formed on or in member 21 by relatively opaque concentric rings 22A, alternating with relatively transparent gaps or rings 22B, with respect to the radiation to be used for tracking control. These rings also serve as optical tracks to define the position of tracks in which information is to be stored in magnetic data recording or storage layers 24 and 25 which are located on opposite surfaces of the base member 20. These layers 24 and 25 are very thin compared to the thickness of base 20 so as to be substantially transparent, or at least highly transmissive, with respect to the radiation used for tracking control.

While the inventive concepts of this invention may be used to advantage in storage apparatus or disk drives using different types of storage media, e.g. magnetic (flexible or rigid), optical or magnetooptical, the illustrated embodiment is directed to a flexible magnetic disk drive as will become more apparent. In this case disk 20 is a flexible or floppy, high density magnetic recording disk contained in a cassette housing or jacket (not shown) and having a plastic (e.g. Mylar) support 21 on which the optical grating pattern 22 is photographically or otherwise formed. Typically, support member 21 is about 0.003 inches thick and the thin magnetic recording layers 24 and 25 have a thickness of about 1 micron.

The composition of layers 24 and 25 typically includes gamma ferric oxide or barium ferrite particles dispersed in a polymeric binder with the latter particle being preferred for higher density data storage. While this type of disk is transmissive to visible light for head position control purposes, it is even more transmissive to light in the infra-red portion of the spectrum and therefore the use of inf.a-red light is preferable.

With reference again to FIGS. 1 and 2, the head carriage assembly 100 includes in operative relationship with the disk 12, a radially movable head support 14 comprising support members 14A and 14B which supports a pair of complementary integrated magnetic and optical heads 0 and 1, respectively, on opposite sides of the disk in spaced operative alignment with each other. Each of the heads 0 and 1 includes a body portion 10, suggested by the dotted lines for visual clarity, which supports and positions the elements of the head including a magnetic read/write transducer 15; a light source 16 and an aligned collimating lens 17; and a light detector 18. It should be understood that the inclusion of collimating lens 17 is preferable for both improving collimation and concentrating light flux, but its use in integrated head is not absolutely necessary.

Each transducer 15 includes a body portion 15a mounting a ferrite core 15b having a flux gap therein at the face of the head confronting the respective adjacent magnetic layer on the disk. The head is adapted to fly over the recording surface in air bearing relation thereto and the body 15a typically includes a slot 15c in the face for selectively reducing pressure in the air bearing for flying height control as is well known in the art. The complimentary arrangement of the transducers 15 in the opposed heads 0 and 1 provides a radial offset of the respective cores 15b. which is desirable to prevent data print-through of the opposite recording surface as is known in the art.

The detector 18 is preferably located on one side of the transducer 15 and the light source 16 and associated lens 17 (if used) are located on the other side, although both of these element could be grouped together on one or the other side. Also it is preferable for tracking purposes to position the detector on the side of the transducer body where it is closest to the core 15b so that the detector "looks at" a portion of the disk that is as close a possible to the magnetic flux gap. While it would be ideal for the detector to look at exactly same portion of the disk as the transducer gap, physically these two element can not occupy the same space and thus are radially offset as shown. However, by locating the detector 18 as close to the transducer core 15b as practical, this offset is minimized.

The arrangement of the detectors 18 and the light sources 16 on the opposed heads 0 and 1 is complimentary so that the light source 16 on head 0 is positioned to direct light output therefrom through the disk 12, for modulation by grating pattern 22, onto the aligned detector 18 of head 1. Similarly the light source 16 on head 1 directs its light output through the disk onto the aligned detector 18 on head 0.

The details of the light sources and the detectors will be discussed in detail hereinafter.

Support member 14A is shown schematically pivotally coupled to support member 14B at hinge point 19. This allows support member 14A to rotate to the raised inoperative position shown in FIG. 2 where heads 0 and 1 are spaced further apart to facilitate disk insertion and withdrawal. As a disk 12 is inserted into the drive and is seated on spindle 13, support member 14A automatically returns to the position shown in FIG. 1. As a disk 12 is removed, support member 14A automatically returns to the position shown in FIG. 2. Support members 14A and 14B need not be coupled together, but it is desirable that one of same should be designed to capable of being moved relative to the other so as to facilitate easy and safe removal and insertion of a disk 12. Mechanisms for effecting such movement of the head carriage supports are well known in the art and need not be discussed further herein.

Because the illustrated head carriage assembly 100 is adapted for use with a flexible disk 12, the upper head 1 is preferably suspended from a gimbal arrangement 26 mounted on the underside of pivoting support 14a which allows head 1 to pivot somewhat about its pitch and roll axis to maintain its face to face alignment with head 1 in the presence of a portion of the spinning flexible disk 12 therebetween that may assume a slight curved shape depending on head penetration and loading. Also, the gimbal mounting is provided to compensate for transient distortions of the flexible disk 12 resulting from disk vibration in response to rotation. Such gimbal arrangements are well known in the art and need not be discussed further herein.

In the previously noted application, U.S. Ser. No. 898,527, optical servo head position control for double sided recording is accomplished with a single optical system comprising a light source on one side of the disk and a detector incorporating the reference grating on the opposite side of the disk. While this system is workable, it presents a difficult and costly manufacturing problem relating to the very tight mechanical tolerances required for mounting the two magnetic transducers and the single detector on the carriage so the detector is in a non-varying predetermined radially spaced relation with respect to each of the magnetic transducers on opposite sides if the disk. The tolerance problem is even more sever in the case of a flexible disk drive because one transducer must be gimbal mounted on the arm of the carriage that pivots or moves relative to the other thus providing two additional tolerance factors to overcome. But, the more important concern is that the gimbal mounted transducer moves in response varying disk dynamics at the head medium interface so its radial spacing from the fixedly mounted detector will vary and result in incorrect position error signals.

As will become apparent, by using two separate optical servo systems and incorporating the optical and magnetic transducer components into an integrated head structure, these types of problems are minimizes.

Because it is important that the spacing between the detector and the active transducer not vary, and given the movable nature of the gimbaled head 1, it is desirable to have the tracking control detector 18 on the same side of the disk as the active transducer 15 doing the reading or writing. This can be satisfied only if a separate detector 18 is adapted to be associated with each side of the disk. This necessitates the inclusion of two separate optical systems, one for each head.

Accordingly, in the head carriage assembly 100 shown in FIG. 1, detector 18 on head 1 is used to control the tracking alignment on the magnetic layer 24 on the upper surface of the disk 12 and detector 18 on head 0 is used to control the tracking alignment on the magnetic layer 25 on the lower surface of the disk 12.

The drive of which the head carriage assembly 100 and spindle 13 are part also includes means for moving the support 14 radially with respect to the disk, and in the cross-track direction with respect to the disk grating 22, so that the head being activated for reading/writing is aligned with the single track being addressed. Such means are under servo control of the head position error information provided by the two optical systems formed respectively by the light sources 16 and detectors 18 on the opposed heads 0 and in a manner similar in certain respects to that described in the aforementioned pending application U.S. Ser. No. 898,527 which is incorporated by reference herein. Additionally, the drive includes means for rotating the disk in operative relation to the disk. These drive components and the operation of head position control system will be described later herein with reference to FIG. 8.

It will be useful to discuss at this point the detection process of the tracking control signals.

The small scale of the optical tracks defined by the opaque rings 22A formed on the disk 12 (shown in FIG. 3) makes it likely that their edge profile will not be ideal but rather will include roughness that may produce additional noise in the servo signals. As an example of the scale, in a 3.5 inch flexible disk format, a high density barium ferrite disk of 20 Mb capacity (10 Mb per side) would require a track density of about 540 TPI.

It is known that the signal-to-noise ratio in a periodic optical system may be improved by spatial filtering, e.i. weighted integration over periodic portions of space. Each detector 18 in its optical sensor used in the preferred embodiment of the invention uses spatial filtering to improve the signal-to-noise ratio of the detection process.

Additionally, it is to be noted that not only is it important for the detection system to detect any misalignment between the active head, i.e. the particular head being aligned, and the desired optical track, but it is also important to ascertain the appropriate direction of radial movement to correct the alignment.

To this end, it has been found advantageous to use an optical grating in the disk in which the width of the opaque lines 22A is essentially equal to the width of the transparent gaps 22B in combination with a detector whose sensor portion includes a first periodic set of viewing apertures spaced by optical stops to form a reference grating, the width of the apertures (the cross track dimension) matching the width of the opaque lines of the optical grating in the disk.

As the reference grating of a detector on a head is moved radially with respect to the disk grating, they act in combination to modulate the intensity of light that reaches the photosensitive portion of the detector behind the reference grating that provides the position error signal. When the two gratings are in phase with their respective opaque and transparent portions in alignment, the amount of light reaching the photosensitive element is at a maximum. When the two gratings are offset by one half track pitch, or are 180 degrees out of phase, the opaque portions of one grating block the transparent portions of the other grating so that the intensity of light that is incident upon the photosensitive element is at a minimum. Advantageously, with this arrangement of equal pitch gratings, the variation of light intensity is essentially linear between the maximum and minimum offset positions of the gratings providing a linear control range for determining position error of the transducer relative to a selected track. Thus, the maximum linear control range is obtained by making aperture width exactly half the track pitch. Each of the periodic apertures is designed to essentially overlie the transition between transparent space and an opaque line of the disk grating so that movement to reduce the amount of light intercepted will tend to center the aperture properly over the transition being tracked.

Moreover, to insure that minor irregularities in edge smoothness of the opaque lines have a relatively small effect, it is desirable to have an aperture whose length along the track is relatively long. That is, because it desirable to follow a smooth track, the effect of irregularities may be lessened by averaging along the track. Thus the length of the aperture along the track should be sufficient so the minor irregularities have a much smaller percentage effect on the amount of light falling on the photosensitive portion of the detector.

However, because the opaque lines of the disk grating are curved, and because the viewing apertures are linear, as is desirable for ease of fabrication, an aperture that is too long may have portions that overlie the opposite transition. To get an effective longer length, the detector is designed also to include a second set of periodic apertures that essentially tracks the opposite transition (opaque to transparent) of the disk grating, i.e., a set like the first set but directly out of phase with it In particular, an ideal detector for generating servo signals would comprise a pair of photodiodes each viewing the same area of the disk through matched spatial filters that lead and lag the magnetic track by ninety degrees of pitch, respectively.

The geometry for such a generator can be realized with a custom photodetector array consisting of two independent active areas, each with a periodic set of fingers whose width matches the width of the lines and gaps to be detected, with the two sets interleaved to form an interdigitated two channel detector whose separate outputs would be supplied to different inputs of a differential amplifier for subtraction.

There is an additional complication in that disks typically are intended to be interchangeable between drives which have the same phasing. While precise manufacturing is one way of insuring the same phasing, this results in an increase in production costs. An alternative is to permit individual drives to be adjusted at time of use to achieve the desired phasing. Although mechanical adjustment of the individual drives is possible, electrical adjustment typically is more attractive and precise.

Figure 4:
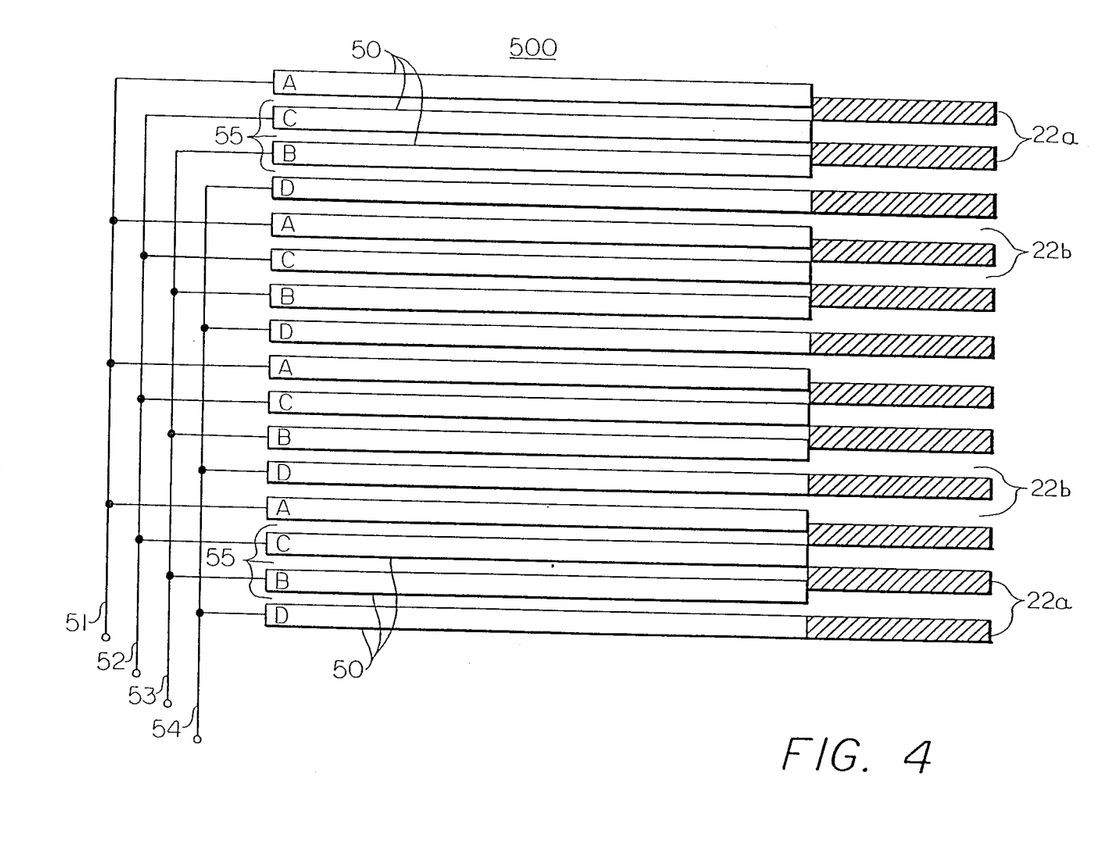
FIG. 4 shows the layout of the various photosensitive elements of a sensor that also serve as a reference grating at the detector for cooperation with the optical grating is the disk, in an assembly of the kind shown in FIGS. 1 and 2.

Referring now to FIG. 4, there is shown the layout of the photosensitive sensor portion 500 of a quadrature detector 18 for use in the present invention and designed additionally to facilitate calibration of each detector 18 to the particular disk used. This sensor comprises a uniformly spaced array of sixteen parallel, rectangular, photosensitive elements 50 interconnected in groups of four to form four photocells. In particular, as depicted, each element labelled A is connected to a common lead 51 and forms part of photocell A, each C element is connected to common lead 52 and forms part of photocell C, each B element is connected to common lead 53 and forms part of photocell B and finally each D element is connected to common lead 54 and forms part of photocell D. It will be convenient to describe the interleaving of elements of four photocells in this fashion as "periodic" interleaving of the elements of the four photocells. Between each element 50 is a non-photosensitive or "dead" space 55 which serves as an optical stop to minimize cross-talk between elements 50.

The array of sixteen elements 50 corresponds essentially to a square aperture desired for the sensor to intercept the infra-red radiation that passes through the disk and is modulated by the disk grating 22.

There is also shown included on the right side of FIG. 4, the opaque lines 22A spaced by gaps 22B forming the optical grating 22 included on the disk. The relative position of the elements 50 of the sensor array to the optical grating 22 corresponds to that when the array is in the alignment corresponding to that desired for stable tracking, with essentially no servo current being generated. It will be noted that the height of the sixteen elements 50 correspond to twelve opaque lines 22A and intervening transparent gaps 22b of the disk grating 22. To this end, each finger element 50 has a width equal to the average width of an opaque (or transparent) grating line 22A and, when active, serves as a half track pitch aperture. Each optical stop 55 has a width of one-half the width of a finger element 50. The uppermost, or first opaque line 22a, has its bottom edge aligned with the top edge of the uppermost or first C finger element. The second opaque line 22a has its top edge aligned with the bottom edge of the first C finger element 50. The third opaque line 22a is aligned with the first D element 50 and the fourth opaque line 22a, like the first, has its bottom edge aligned with the top edge of the next or second C element 50 and the pattern is repeated.

The result is that all four of the finger elements 50 of an individual photocell have the same spatial phase relation with the optical grating 22. It can be seen that the horizontal center lines of elements 50 of photocells A are spaced one and one-half pitch distance of the optical grating 22 from the horizontal centerlines of the elements 50 of photocell B, and the horizontal centerlines of elements 50 of photocell C are similarly spaced from the elements 50 of photocell D. Moreover, the horizontal centerlines of the elements 50 of photocell A are spaced three quarters of the pitch distance of optical grating 22 from the horizontal centerlines of elements 50 of photocell C, as are the elements 50 of photocell B from the elements 50 of photocell D.

Figure 5:
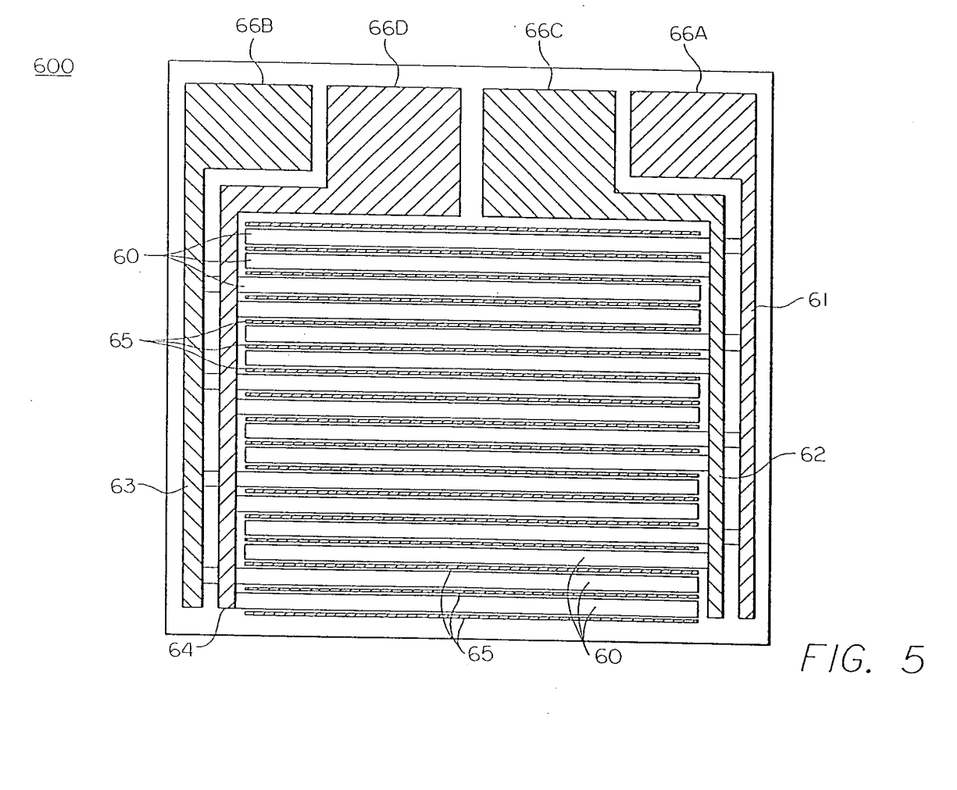
FIG. 5 shows a plan view of silicon device that forms a sensor of the kind included in FIG. 4.

Referring now to FIG. 5, there is shown a four channel sensor of this kind. It comprises a silicon chip 600, the back surface (not shown) of which includes an N-type region covered with a large area electrode (not shown), the front surface of which includes an array of sixteen elongated P-type regions 60, corresponding to the sixteen elements 50 shown in FIG. 4. Generally, there is included an intermediate intrinsic layer (not shown) between the P-type and N-type region to form sixteen PIN structures (not shown) that are photosensitive. The spacing of the sixteen elements is as previously described and each group of every fourth element is connected to a different one of four output electrodes 61, 62, 63, and 64 corresponding respectively to leads 51, 52, 53 and 54 of FIG. 4. Large area conductive pads labelled 66A, 66B, 66C and 66D, respectively, are provided as output terminals of the four photocells A, B, C and D. The electrode (not shown) on the back surface (not shown) serves as a common electrode for the four photocells A,B,C, and D. Aluminum strips 65, opaque to the illumination, serve as optical stops to isolate individual P-type regions from their neighboring P-type regions.

Referring now to FIG. 6, there is shown how the four photocells A, B, C and D are interconnected to form a quadrature detector 70. A common electrode of each is a.c. grounded. Output electrodes (terminals) of cell A and cell B are connected to the inverting and non-inverting input ports, respectively, of a differential amplifier 71 and output electrodes (terminals) of cells C and D are connected to the inverting and non-inverting input ports, respectively, of a differential amplifier 72. An output terminal of amplifier 71 is supplied directly to one position of a switch 73, and by way of an inverter circuit 74, to the other position of switch 73. Similarly, an output terminal of amplifier 72 is supplied directly to one position of a switch 75 and indirectly, by way of an inverter circuit 76, to the other position of switch 75. Respective output terminals of switches 73 and 75 are connected to opposite ends of a potentiometer 77, whose adjustable center tap 78 supplies an output terminal 79 of the detector. The settings of switches 73 and 75 and of the center tap 78 are adjusted typically during a calibration phase, when a disk 12 is first inserted in the drive, so that when a read/write transduce core 15b is properly aligned with a reference track provided on the disk 12, a null is measured at the output terminal 79, corresponding to an absence of servo signal for providing any adjusting movement of the head carriage 14. It will usually be desirable to include a reference track (not shown) on the disk together with appropriate control circuitry (not shown) to set the switches and the potentiometer tap electronically. It should be also understood that the switches 73 and 75 and the potentiometer 77 are electronic components well known for such roles.

It can also be appreciated that this circuit can act to correct for offsets between the center of the magnetic track and the center of the optical track.

It can be shown that by making the width of each finger element 60 of the sensor equal to one-half the pitch distance of the disk grating 22, the range of linear control is maximized, and by dividing this pitch distance equally between the opaque line and the transparent gap in the disk grating 22, the chances for a jump between tracks when there is a drift from alignment is minimized.

Additionally, by using four photosensitive finger elements 60 in each photocell spaced apart by an integral number of pitch distances (three pitches in the illustrated embodiment), there is effectively enlarged the size of the detector for higher sensitivity which results in better averaging out noise arising from the various sources. These sources of noise typically include irregular spacing and ragged edges of the grating lines, the viewing of optical patterns through grainy magnetic coatings 24 and 25, and, also, non-uniformities in the disk 12 such as elliptical track distortion caused by anisotropy of a disk's base material 21. It should be understood that an integral multiple of four can be used for the total number of elements 60 to be used for division between the four photocells A,B,C, and D, the larger the number the greater the averaging effect.

Moreover, by using a pair of photocells such as photocells A and B, viewing essentially the same area that lead and lag the magnetic tracks, respectively, by one-quarter the pitch distance, one for tracking the upper illustrated edge of an opaque disk grating line 22a and the other for tracking the lower edge of grating of the next adjacent line 22a, there is effectively canceled out common mode noise which may be caused, for example, by variation of the intensity of the illumination source or variations in the optical transmission characteristics of the magnetic coatings 24 and 25.

Finally, a quadrature detector formed by interleaving two sets of pairs of photocells, shifted in phase in the manner described, there is added an extra degree of freedom for electrical adjustment to compensate both for minor deviations from uniformity because of imprecision of manufacture of different transducers and for offsets between the centers of the magnetic and optical tracks.

In the illustrated embodiment, the sensor 600 utilizes the geometry of the individual photosensitive elements 60 and their relative spacing in the array to form a photosensitive electronic reference grating, thus combining the function of light modulation and detection into a single structural element. In this sensor, each of the elements 60 functions as an aperture for its corresponding photocell and the aluminum stripes 65 serve as optical stops. However, each element 60, while serving as an aperture for its own photocell, also effectively serves as an optical stop for the other photocells. For example, with regard to photocell A, the intervening elements 60 of cells C, B, and D do not provide signals to the A channel even though light passing through the disk 12 is incident thereupon, so effectively these elements are inactive as far as photocell A is concerned and thereby function as optical stops.

To maximize the effectiveness of the tracking technique, various other considerations are also important.

First, it is desirable to maximize the degree of modulation and the triangular waveform of the servo-signal provided by the sensor while minimizing the distortion arising from separation of a detector 18, formed by sensor 600 from the optical grating 22 on the disk. This distortion is caused by diffraction blur and can be minimized ideally by locating the detector 18 in close proximity to the disk 12. However, this is not always easy to do because there are usually wire leads bonded to the top surfaces of the conductive pads 66 of the photocells and these tend to limit how close the detector 18 on an integrated head 0 or 1 may be positioned to the disk. Nevertheless, in some instances it has been the practice to position the detector 18 as close to the disk as such obstructions permit, tolerating some degradation of the disk grating modulated light pattern received.

Figure 9:
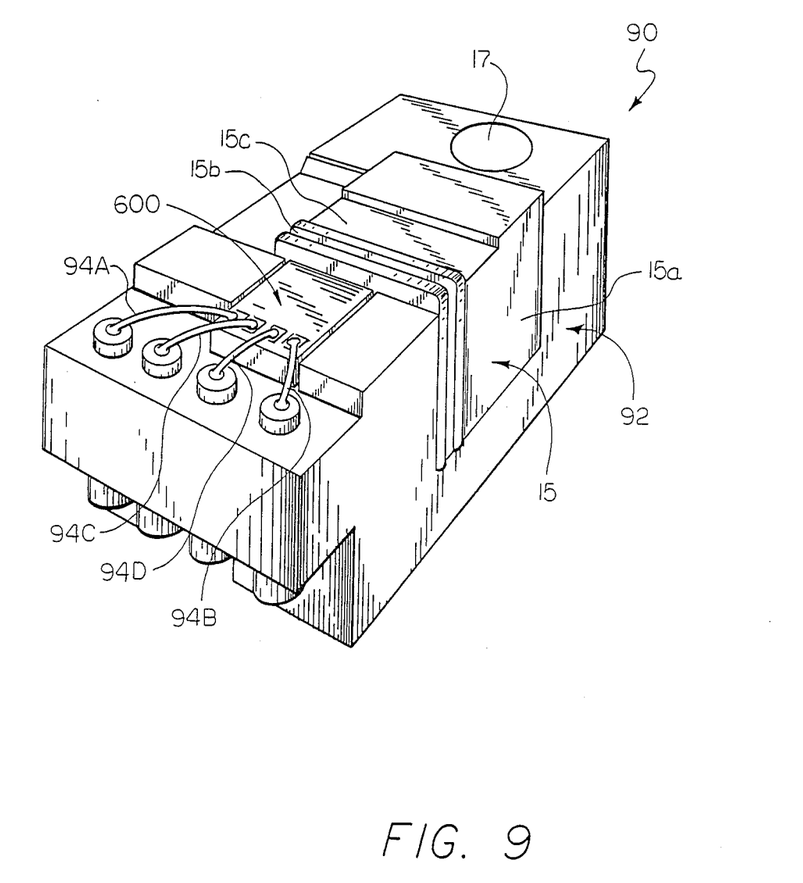
FIG. 9 is a perspective view of an integrated head structure in accordance with the present invention.

One such integrated head structure is shown in FIG. 9 wherein integrated head 90 comprises a body portion or collar 92 adapted to receive and support a magnetic transducer 15 as shown. Adjacent the ferrite core 15b, collar 92 mounts the sensor 600, which is the equivalent of the detector 18 in FIG. 1, in fixed radial spaced relation to the flux gap of core 15b. On the opposite side of transducer 15, the collar mounts a lens 17 for directing the light output from a light source 16 therebehind (not shown) through the disk 12.

The collar 92 supports the sensor 600 as close as possible to as the plane of the flux gap while permitting space for the wire bonded leads 94a–d connected to the corresponding pads 66a–b. Although not shown in the drawings, thin transparent covers may be provided over the sensor 600 and lens 17 to provide the head 80 with a smoother face that is adapted to confront the disk surface.

Alternatively, it is also possible to include an optical element such as a gradient-index rod in the head body adjacent to the disk facing surface to image the optical grating 22 of the disk onto the reference grating of the detector 18, but this structure tend to be difficult and costly to package and manufacture.

Another approach includes the use of highly collimated light from a quasi-point or line source for the illumination so that the disk grating 22 self images on the reference grating of the detector 18 by diffraction. This can make for easier packaging, less expensive optics, and reduced optical noise resulting from dirt, scratches and edge roughness in the media.

One technique to achieve collimation and therefore to form a diffraction image is to use a laser diode light source 16, as a quasi point source or line source at the infinity focal plane of a lens, such as a gradient index rod, a plastic aspheric collimating lens, or a holographic collimating lens, to supply a collimated beam of light. This light is transmitted through the optical grating 22 of the disk to self image optical grating 22 onto the surface of the detector 18 incorporating the reference grating therein. The detector 18 is placed at a distance D from the disk grating 22 as given by the relation $D = P^2/L$, where P is the pitch of the disk grating 22 and L is the wavelength of the light. Alternatively, it may be preferable from a cost and packaging view to substitute an edge light-emitting diode or area light-emitting diode, wherein the emitting area is less than 5 microns in one dimension, as a quasi-point or line source for the diode laser light source 16, thereby also avoiding objectionable interference patterns that may arise because of the temporal coherence of a laser. When line sources are used, they should be aligned to be parallel to the disk and detector gratings.

Figure 7:
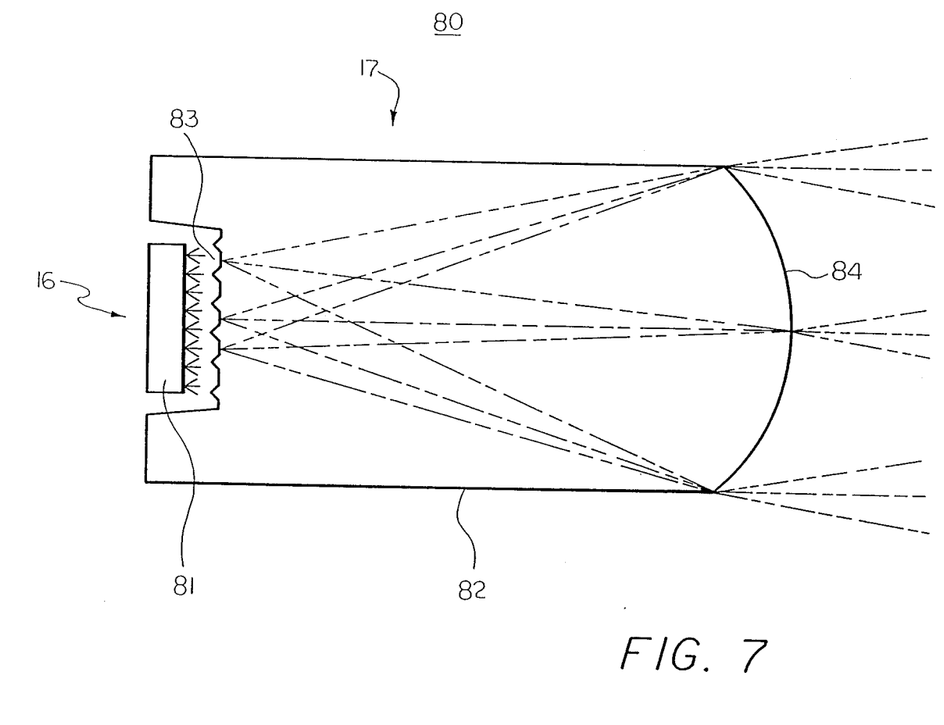
FIG. 7 shows a novel form of illumination source suitable for use in the assembly shown in FIGS. 1 and 2.

An alternative that permits use of a relatively large or extended area light source 16 is shown in FIG. 7. It includes a surface area light-emitting diode 81, illuminating the rear surface of optical element 82. This rear surface includes an entrance surface 83 that is shaped to form a linear grating and coincides with the infinity focal plane of optical element 82. In particular, the surface 83 includes flat portions where light enters for passage to the exit surface 84, alternating with rearwardly extending V shaped faceted portions where incident light is scattered and does not effectively pass through to the exit surface. The exit light surface 84 is aspheric so that element 82 serves as a collimating lens. Because of the geometry of element 82, the extended area light emitting diode 81 simulates an array of line sources. As a result, there exits from exit surface 84 a set of angularly spaced collimated beams, one for each of the flat portions of the entrance surface 83, that are spatially coherent. In the interest of simplicity, only three of the beams are shown in FIG. 7. These beams are then passed through the optical grating 22 in the disk 12 to self image the disk grating 22 on the detector reference grating, as previously indicated to be desirable. The linear grating formed at the entrance surface 83 is designed to have a periodicity that causes the corresponding multiple self images to superimpose constructively.

It is possible, if desired, to position the reference grating on the detector 18 further from the disk grating 22 at the focus of a higher order diffraction self image.

Another type of optical element 17 that may be used in the integrated head structure is a diffraction lens, or zone plate, that is a circular diffraction grating which focuses light not by refraction like a standard lens, but by diffraction. In an integrated head it would serve as a collimator lens for a quasi-point source LED.

Figure 10A:
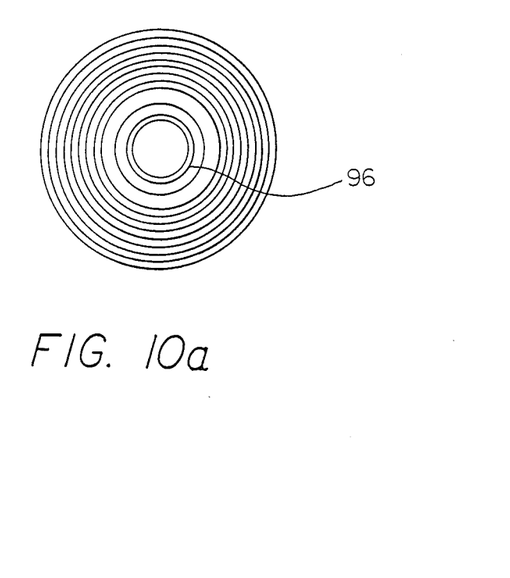
FIG. 10a is a plan view of a diffraction lens used for collimating purposes in an a head embodying the present invention.
Figure 10B:
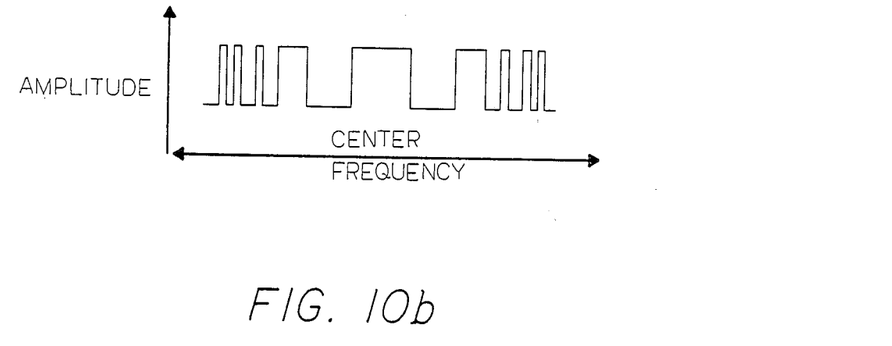

The diffraction lens comprises alternating opaque and transparent zones 9 concentric circles), each zone having the same area, but the pitch of each zone decreases from the center to the outer edge. Such a diffraction lens 96 is shown in FIG. 10a. The cross section of lens 96 is shown schematically in FIG. 10b. The amplitude of each diffraction element peak is equal, but the frequency of circular elements increase toward the outer edge. The grating is symmetrical, so light is diverted into the zero order and equally into the positive and negative first orders of diffraction. Weaker focal points occur at each positive and negative odd order of diffraction ( i.e., 3,5,7 . . . etc).

Alternatively, light may be diverted preferentially into a selected order by including appropriate asymmetry in the grating of the diffraction lens.

The aforementioned methods in addition tend to improve the modulation of the detected signal.

Figure 8:
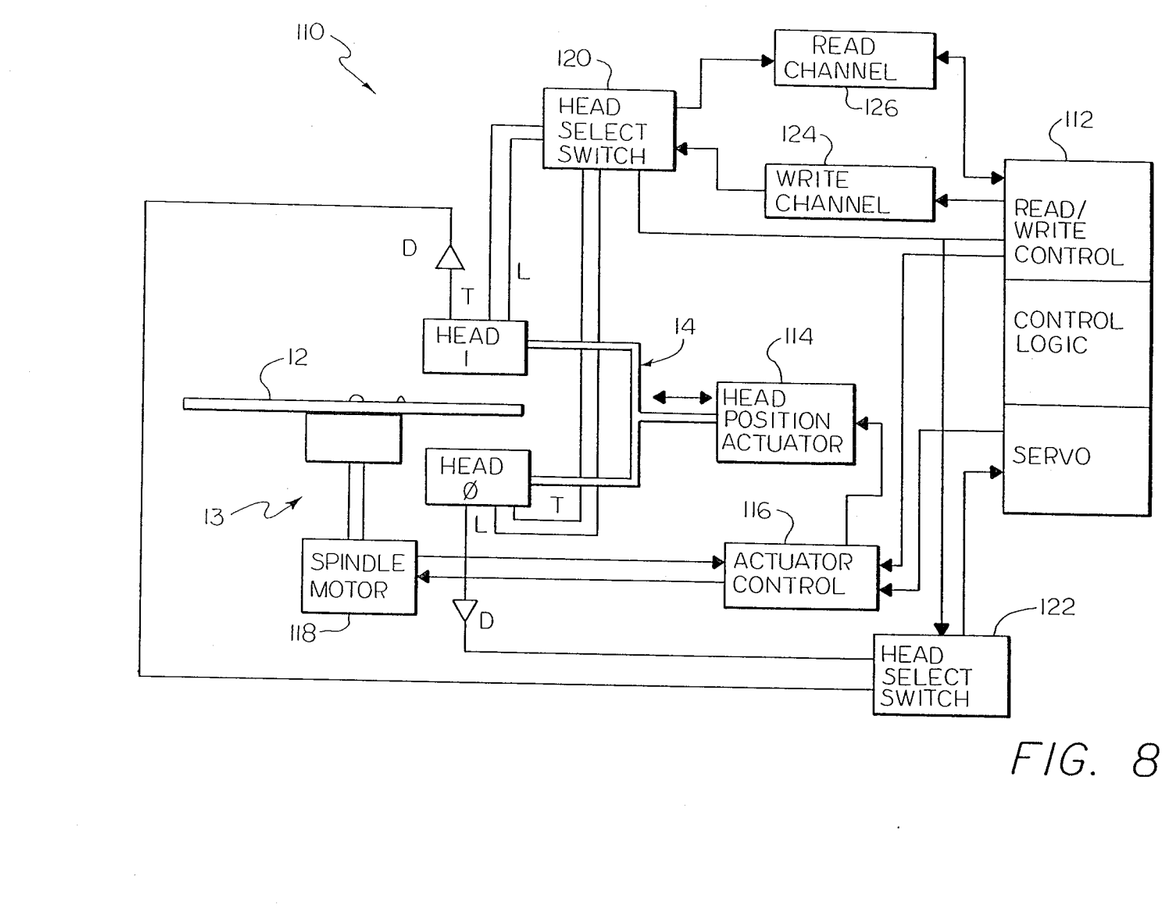
FIG. 8 shows in functional block diagram form a data storage apparatus embodying the present invention.

A data storage apparatus or flexible magnetic disk drive 110 embodying the present invention is shown in functional block diagram form in FIG. 8. The apparatus 110 operates under the control of a controller circuit 112 having read/ write control and servo circuits sections that are operated in a coordinated manner under the administration of a microprocessor based control logic circuit section. The controller 112 also is provided with an interface section for operatively connection the drive 110 to a host computer (not shown).

The head carriage assembly 14 is connected to a head position actuator 114 responsive to head position signals provided by an actuator control circuit 116 for moving the head carriage assembly 14 radially with respect to the disk 12 for track seek, read/write and position error adjustment operations. The actuator 114 preferably is of the fast response, precise positioning type and may be selected from a variety of such actuators recognized in the art as being suitable for high data density applications.

The apparatus 110 also includes means for moving the storage medium past the read/write transducers and, in the illustrated embodiment, such means take the form of a spindle motor assembly 118 for effecting rotation of the disk 12. The spindle motor assembly 118 is operated by the actuator control circuit 116 which receives index signals from the motor assembly 118 and provides drives signals thereto in a well known manner. The actuator control circuit 116 in turn operates in response to input signals received from the read/write control and servo circuits of the controller 112.

To effect servo controlled head tracking, both of the integrated heads 0 and 1 are operative, but the head that is enabled for read or write operations with respect to its adjacent facing side of the disk 12 is designated as the "active head". The non-active head on the opposite side of the disk 12 is operative in that its light source 16 is turned on to direct light through the disk, for modulation by the optical pattern or grating 22, and onto the reference grating of the detector 18 on the active head adjacent its enabled corresponding read/write transducer 15.

Upon receipt of the active head designation signals from the host computer, the controller 112, through its control logic section, directs the read/write control circuit to send head selection signals to two head select switching circuits, 120 and 122, which configure the heads for the designated selection. The first head select switch circuit 120 is connected between the read/write control circuit if the controller 112 and the read/write transducers 15 and light sources 16 of heads 0 and 1. The second head select circuit 122 likewise connected between the controller 112 and the detectors 18 of heads 0 and 1 and is operative to direct the position error signal output from the detector 18 on the active head to the servo circuit which in response provides corrective position signals to the actuator control circuit 116 to effect alignment of the active head transducer with the selected track.

Data to be recorded on the disk 12 is fed from the read/write section through a write channel circuit 124 connected to the first head select switch 120 while data that is to be read from the disk is routed through a read channel circuit 126 connected between the first head select switch 122 and the read/write control circuit.

If data is to be written on or read from the 0 side of the disk (the underside as viewed in FIG. 8), head 0 is designated as the active head. In this mode, the read/write control circuit directs the head select switch 120 to assume a configuration whereby the read/write transducer 15 on head 0 is connected to the appropriate one of the read and write channels 126 and 124 (and the transducer on head 1 is disconnected therefrom) and the light source 16 on head 1 is energized to direct its light output through the disk 12 and onto the reference grating of the detector 18 on head 0 which the second head select circuit 120 has connected to the servo circuit in response to the active head designation provided by the read write control circuit. While the head 1 light source 16 is energized, the first head select circuit 120 maintains the head 0 light source 16 in a de-energized state and the second head select switch 122 blocks signals from the detector 18 on head 1 from being transmitted to the servo circuit.

In the opposite mode for writing data onto or reading it from side 1, the head select switches are reversed to connect the transducer on head 1 to the appropriate one of read and write channels 162 and 124 , to energize the light source 16 on head 0 and direct the position error signal output from the "active" detector 18 on head 1 to the servo circuit.

With the disk 12 mounted on the spindle 13, the position of its grating 22 is relatively fixed and the reference gratings on the heads 0 and 1 primarily move relative thereto for modulating the light intensity sensed by the detector 18. In effect the two gratings act as a comb type shutter so that when the detector apertures are aligned with the light transmissive gaps of the disk grating 22, maximum light intensity is sensed and when the apertures are in the opposite phase relation to the gaps, minimum light intensity is sensed. Between these two conditions sensed light intensity varies linearly and thereby provides proportionate head position error information.

In the case of a flexible disk, a previously recorded circular magnetic track may assume an elliptical shape due to anisotropic expansion of the disk base material, so in effect the rings of the disk grating 22 have moved or shifted relative to the reference grating which causes a change in the intensity of light at the quadrature detector 18. In response, detector 18 provides the appropriate error position signal to the servo circuit to effect movement of the head carriage 14 for aligning the active head with the selected track.

The illumination used in the illustrative system, typically infra-red in a band centered at about 890 nanometers, is readily available from GaAlAs light-emitting diodes or GaAlAs diode lasers. Silicon photocells are convenient to use at such wavelengths. Moreover, light at this wavelength is compatible with the typical materials used for the magnetic disk and can readily be arranged to be absorbed by the opaque portions of the optical grating 22. Of course, other wavelengths can be used that satisfy the various requirements that must be met if the illumination is to function in the role desired.

While the invention has been described with reference to the use of disks, either floppy or rigid, as the storage medium, it should be obvious that the invention is applicable with obvious modifications to other forms, such as tape, where the information is stored in linear tracks and there is a need for accurate alignment of a read/write head with the particular track being addressed.

It should also be apparent that various of the features discussed for the illustrated preferred embodiment of the invention may be omitted or modified. For example, the quadrature detector may be omitted and a simpler form of detector substituted. Such a simpler form might be a large area photosensitive cell whose surface has been suitably masked to form a linear reference grating thereof for cooperation with the optical grating in the disk. Alternately, there may be employed simply a pair of photocells each including an array of spaced strip elements, the two arrays being interleaved in a fashion to form a linear reference integrating at the detector for cooperation with the optical grating in the disk.

The various other components needed for a complete system, but not described, are all well known in the art and so have not been described.

Because other modifications or changes may be made in the data storage apparatus of the present invention, or in the various components thereof, without departing from the scope and spirit of the invention, the embodiment shown and described herein should be viewed as illustrative and not in a limiting sense.

What is claimed is:

1. A data storage apparatus for use with a double sided data storage medium of the type including a transparent support, a light transmissive data storage layer on each of respective opposite sides of the support, and an optical grating formed on or in the support between the storage layers for defining locations of data storage tracks in the storage layers, said apparatus comprising:

mean for supporting and moving such a medium for data read and/or write operations;

first and second heads each including a data recording and/or reading transducer, a light source, and a detector, including a reference grating, responsive to light transmitted through the medium for modulation by the medium grating formed on or in the support and thereafter incident upon said reference grating for providing position error signals indicative of the position of an associated transducer relative to a selected track;

a head carriage configured for cross track movement relative to the medium and mounting said first and second heads thereon in complementary alignment on opposite sides of the medium such that said transducers are each in recording and/or reading relation to an adjacent one of the storage layers, said light source on said first head is positioned to direct its light output through the medium and onto said reference grating of said detector on said second head, and said light source on said second head is positioned to direct its light output through the medium and onto said reference grating of said detector on said first head for providing said position error signals; and means responsive to said position error signals for moving said head carriage to maintain a selected one of said transducers in aligned relation to a selected track.

2. A magnetic data storage apparatus for use with a double sided magnetic data storage medium of the type including a transparent support, a light transmissive magnetic data storage layer on each of respective opposite sides of the support, and an optical grating formed on or in support between the storage layers for defining locations of data storage tracks in the storage layers, said apparatus comprising:

mean for supporting and moving such a medium for data read and/or write operations;

first and second heads each including a magnetic data recording and/or reading transducer, a light source, and a detector, including a reference grating, responsive to light transmitted through the medium for modulation by the grating formed on or in the support and thereafter incident upon said reference grating for providing position error signals indicative of the position of an associated transducer relative to a selected track;

a head carriage configured for cross track movement relative to the medium and mounting said first and second heads thereon in complementary alignment on opposite sides of the medium such that said transducers are each in recording and/or reading relation to an adjacent one of the storage layers , said light source on said first head is positioned to direct its light output through the medium and onto said reference grating of said detector on said second head, and said light source on said second head is positioned to direct its light output through the medium and onto said reference grating of said detector on said first head for providing said position error signals; and means responsive to said position error signals for moving said head carriage to maintain a selected one of said transducers in aligned relation to a selected track.

3. The magnetic data storage apparatus of claim 2 wherein the magnetic storage medium is a flexible magnetic recording disk and said head carriage includes first and second head supports, at least one of said first or second head supports being mounted for movement between a first position wherein said first and second heads are in operative relation to the disk and a second position wherein said first and second heads are spaced further apart than when in said first position to facilitate disk insertion and removal.

4. The magnetic data storage apparatus of claim 3 wherein said first head is timbal mounted on said first support.

5. The magnetic data storage apparatus of claim 2 where on each of said first and second heads, said light source and said detector are disposed on opposite sides of said magnetic transducer.

6. The magnetic data storage apparatus of claim 5 wherein said transducer includes a magnetic core, having a flux gap, mounted near one side of a transducer body and said detector is located adjacent said one side to position said detector in close relation to said core.

7. The magnetic data storage apparatus of claim 2 wherein each of said detectors comprises a photosensitive sensor which is configured to serve as reference grating as well as providing said position error signals.

8. The magnetic data storage apparatus of claim 2 wherein the magnetic storage medium is a flexible magnetic recording disk having a grating therein formed by concentric opaque rings separated by transparent rings to define the location of concentric circular data tracks in magnetic recording layers on opposite sides of the disk, and in which each detector includes a sensor comprising a plurality of uniform parallel photosensitive elements spaced apart to define said reference grating for cooperating with the disk grating.

9. The magnetic data storage apparatus of claim 8 in which each sensor comprises four separate photocells, each photocell producing an output and including a plurality of said photosensitive elements, said photosensitive elements of said four photocells being periodically interleaved and spaced apart for defining said reference grating.

10. The magnetic data storage apparatus of claim 9 in which the transparent rings of the grating formed on or in the support are of a width equal to the width of the opaque rings and in which the width of said photosensitive elements of the detector is equal to that of each of said opaque and transparent rings and in which said photosensitive elements are spaced apart by a distance equal to one-half the width of said photosensitive elements.

11. The magnetic data storage apparatus of claim 10 in which said means responsive to the position error signals includes a circuit which is supplied with the output of the four photocells for deriving a position error signal as a measure of any misalignment between a head and a selected track.

12. The magnetic data storage apparatus of claim 11 in which said circuit includes a first differential amplifier whose two inputs are supplied with the outputs of two of the photocells and a second differential amplifier whose tow inputs are supplied with the outputs of the others of the photocells, and the outputs of the two differential amplifiers are supplied to opposite ends of a variable impedance means that includes a terminal where a position error signal is available.

13. The magnetic data storage apparatus of claim 2 further including means for imaging a respective aligned portion of the grating formed on or in the support onto said reference grating of each said detector.

14. The magnetic data storage apparatus of claim 13 in which said imaging means includes means for self imaging by diffraction said respective aligned portion of the grating formed on or in the support onto each said reference gratings.

15. The magnetic data storage apparatus of claim 2 in which said light source of each said head comprises an area light emitting diode and each head further includes optical means for forming incident illumination provided by said diode into a plurality of collimated angularly spaced beams of light that are spatially coherent.

16. The magnetic data storage apparatus of claim 15 in which said optical means includes means for providing that multiple self images associated with the plurality of collimated beams image the grating formed on or in the support on the reference grating of the detector constructively.

17. The magnetic data storage apparatus of claim 16 in which said optical means includes an optical element that includes an entrance surface that includes an array of flat surfaces spaced by faceted surfaces and an exit surface that is aspheric for forming the incident illumination into the plurality of angularly-spaced collimated beams of light.

18. The magnetic data storage apparatus of claim 2 in which each of said light sources comprises a quasi-point or line source and each head further includes a collimating optical element positioned such the said light source is at the infinity focus of said collimating optical element and parallel to said grating formed on or in the support.

19. The magnetic data storage apparatus of claim 18 in which said collimating optical element is a plastic aspherical lens.

20. The magnetic data storage apparatus of claim 18 in which said collimating optic is a diffraction lens.

21. The magnetic data storage apparatus of claim 18 in which said collimating optic is a gradient index lens.

22. The magnetic data storage apparatus of claim 18 in which each said quasi-point or line source is an edge emitting light emitting diode.

23. The magnetic data storage apparatus of claim 18 in which each said quasi-point or line source is a laser diode.

24. The magnetic data storage apparatus of claim 18 in which pairs quasi-point line source is an area emitting light emitting diode with its area of emission approximating a quasi-point or line source.

25. The magnetic storage apparatus of claim 2 wherein said light sources are infro-red light sources.

26. The magnetic storage apparatus of claim 25 wherein said light sources emit infra-red light in a band centered about 890 nanometers.

27. A magnetic data storage apparatus for use with a double sided flexible magnetic data storage disk of the type including a transparent support, a light transmissive magnetic data recording layer on each of respective opposite sides of the support, and a circular optical grating formed on or in the support between the recording layers for defining the location of circular data storage tracks in the recording layers that are concentric with the disk axis of rotation, said apparatus comprising:
 mean for supporting and rotating such a disk about its axis for data read and/or write operations;
 first and second heads each including a magnetic data recording and/or reading transducer, a light source, and a photosensitive detector configured as a reference grating responsive to light transmitted through the disk for modulation by the grating formed on or in the support and thereafter incident upon said reference grating for providing position error signals indicative of the position of an associated transducer relative to a selected track;

a head carriage configured for cross track movement relative to the medium and mounting said first and second heads thereon in complementary alignment on opposite sides of the disk such that said transducers are each in recording and/or reading relation to an adjacent one of the recording layers, said light source on said first head is positioned to direct its light output through the disk and onto said reference grating of said detector on said second head, and said light source on the second head is positioned to direct its light output through the disk and onto said reference grating of said detector on said first head for providing said position error signals; and means responsive to said position error signals for moving said head carriage to maintain a selected one of said transducers in aligned relation to a selected track.

28. The magnetic data storage apparatus of claim 27 wherein the circular grating formed on or in the support is formed by opaque rings separated by transparent rings of a width equal to the width of the opaque rings, and said photosensitive detector includes a plurality of uniform aperture defining photosensitive elements, each having a width equal to that of the opaque o-nd transparent rings, spaced apart by optical stops each having a width equal to one-half of the width of said photosensitive elements.

29. The magnetic storage apparatus of claim 28 wherein there are sixteen of said photosensitive elements connected in periodic groups of four elements to form four photocells which are periodically interleaved to form said reference grating.

30. The magnetic data storage apparatus of claim 27 further including means for coordinating the operation of said first and second heads such that when one of said first and second heads is designated as the active head for read and/or write operations, said light source on said active head is deenergized and said light source on the opposite head is energized to transmit light through the disk and onto the reference grating of said active head.

31. An illumination system for use in magnetic data storage apparatus in which the illumination system is used in an optical system for servo control of the position of a magnetic transducer relative to a data storage track, said system comprising;

an area light emitting diode; and means in collecting relation of light emitted by said diode including an entrance surface which includes a plurality of flat portions spaced by a plurality of faceted portions of a given width and an exit surface which is aspheric for collimating the light incident on said flat portions into a plurality of beams spaced apart by the width of said faceted portions.

32. A integrated magnet is recording and optical servo head for use in complementary pairs of heads disposed on opposite sides of a double-sided, light transmissive, flexible, magnetic recording disk having an optical grating between a pair of magnetic recording layers on opposite sides of the disk, said head comprising:

a body for supporting components of said head;

a magnetic read and/or write transducer mounted on said body;

a light source for transmitting light through the disk for modulation by the disk grating, said light source being mounted on said body to one side of said transducer; and a detector, including a reference grating for sensing light transmitted through the disk by a light source on a complementary head on the opposite side of the disk and incident upon said reference grating for providing position error signals for use by a head tracking servo system, said detector being mounted on said body on the opposite side of said transducer.

* * * * *